US007248386B2

United States Patent
Nishi

(10) Patent No.: US 7,248,386 B2
(45) Date of Patent: Jul. 24, 2007

(54) PRINTING APPARATUS, PRINT INSTRUCTION APPARATUS, IMAGE FORMING APPARATUS, PRINTING METHOD AND A COMPUTER-READABLE RECORDING MEDIUM STORING A PROGRAM FOR INPUTTING A MINIMUM CHARACTER SIZE FOR N-UP MODE PRINTING

(75) Inventor: Eiji Nishi, Saitama (JP)

(73) Assignee: Fuji Xerox Co., Ltd, Tokyo (JP)

( * ) Notice: Subject to any disclaimer, the term of this patent is extended or adjusted under 35 U.S.C. 154(b) by 653 days.

(21) Appl. No.: 10/395,115

(22) Filed: Mar. 25, 2003

(65) Prior Publication Data

US 2004/0047002 A1 Mar. 11, 2004

(30) Foreign Application Priority Data

Sep. 10, 2002 (JP) ............................. 2002-264431

(51) Int. Cl.
*G06K 15/02* (2006.01)
(52) U.S. Cl. ..................... 358/1.2; 358/1.11; 358/1.13; 358/1.15
(58) Field of Classification Search ................. 358/1.2, 358/1.11, 1.13, 1.15
See application file for complete search history.

(56) References Cited

U.S. PATENT DOCUMENTS 6,667,814 B1 * 12/2003 Tillotson .................... 358/1.15
2003/0160975 A1 * 8/2003 Skurdal et al. .............. 358/1.2

FOREIGN PATENT DOCUMENTS

| JP | A 7-156449 | 6/1995 |
| JP | A 8-183222 | 7/1996 |
| JP | A 2001-157033 | 6/2001 |
| JP | A 2001-169087 | 6/2001 |

OTHER PUBLICATIONS

Lonnie E. Moseley and David M. Boodey, Mastering Microsoft Office 97, 1997, Sybex Inc., 94, 167-170, 295, 358.*

* cited by examiner

*Primary Examiner*—Aung S. Moe
*Assistant Examiner*—Vincent M. Rudolph
(74) *Attorney, Agent, or Firm*—Oliff & Berridge, PLC

(57) ABSTRACT

When user specifies a desired minimum font size through a host computer 2, and issues a print instruction to a printer 3, a recommended N-up number operating section 37 of the printer 3 performs an arithmetic operation to obtain a maximum N-up number with which font size not larger than the desired minimum font size are not included. A printing section 35 of the printer 3 prints the obtained N-up number of sheets of original document images on one sheet of paper.

13 Claims, 6 Drawing Sheets

PRINTING APPARATUS, PRINT INSTRUCTION APPARATUS, IMAGE FORMING APPARATUS, PRINTING METHOD AND A COMPUTER-READABLE RECORDING MEDIUM STORING A PROGRAM FOR INPUTTING A MINIMUM CHARACTER SIZE FOR N-UP MODE PRINTING

The present disclosure relates to the subject matter contained in Japanese Patent Application No. 2002-264431 filed on Sep. 10, 2002, which is incorporated herein by reference in its entirety.

BACKGROUND OF THE INVENTION

1. Field of the Invention

The present invention relates to printing apparatus, print instruction apparatus, image forming apparatus, a printing method and a program having an N-up function (or Nin1 function) for printing out a predetermined number of sheets of original document images on one sheet of paper, and particularly relates to printing apparatus, print instruction apparatus, image forming apparatus, a printing method and a program in which excessive reduction in font size is prevented in the N-up mode so as to prevent readability from being spoiled and thereby reduce waste of paper.

2. Description of the Related Art

The following documents are relevant to the invention.
Patent Document 1: JP-A-2001-157033
Patent Document 2: JP-A-2001-169087
Patent Document 3: JP-A-7-156449
Patent Document 4: JP-A-8-183222

Printing apparatus disclosed in Patent Document 1 performs Nin1 processing as follows. That is, when an original document is recognized as an original document including images different in direction at the time of Nin1 setting, at least N pages of the original document to be disposed in one and the same page of paper with their directions remaining as they are reduced uniformly at one and the same reduction rate while preventing the images from being damaged. Thus, Nin1 printing can be performed even on an original document including images different in direction so that the images are prevented from being damaged while the print is made as easy to read as possible.

Printing apparatus disclosed in Patent Document 2 recognizes an undisposed area where no original document image has been disposed in a print area corresponding to one page of paper, and determines whether one selected original document image can be printed in the undisposed area or not. When it can be printed, the original document image is disposed in the undisposed area. When it cannot be printed, the original document image is disposed in a print area of another page. Thus, it is determined whether one selected original document image can be printed in a blank space or not, so that images are prevented from being damaged in Nin1 printing while the print is made as easy to read as possible.

Printing apparatus disclosed in Patent Document 3 has a memory for storing basic fonts of characters each made up of a dot pattern of 42×42 dots, a memory for storing basic fonts of portrait images each made up of a dot pattern of 32×32 dots, an input section for inputting print data, a printing section for printing the print data on paper, and a conversion section for expanding the basic fonts. When the print data includes characters and portrait images, the basic fonts of the portrait images are expanded 3/2 times by the conversion section so that the characters and the portrait images are printed in one and the same size. Thus, images and characters different in basic font size can be printed in one and the same size.

Printing apparatus disclosed in Patent Document 4 has an input section, a print range specifying section, a storage section, a printing size determining section and a printing section. Print data is inputted from the input section. The print range specifying section specifies a print range on a printing medium. The storage section stores character font data. The printing size determining section determines the printing size of the print data on the basis of the quantity of the print data inputted from the input section and the print range specified by the print range specifying section. By the printing section, the character font data stored in the storage section and corresponding to the print data inputted from the input section is printed on the printing medium within the range specified by the print range specifying section in accordance with the printing size determined by the printing size determining section. Thus, data can be printed or displayed while character fonts having the optimal size are selected in accordance with the size of the print range or the display range, the number of input characters, and the like.

However, in the related-art printing apparatus, print data is made up in accordance with the N-up number (the number of sheets to be printed on one sheet of paper in the Nin1 processing) specified by a user regardless of the font size in the original document. Thus, when the N-up number is set at a large value, the font size in the printing result becomes so small that the readability may be spoiled.

In addition, assume that the N-up function is used to make the number of print sheets as small as possible while the font size in the printing result is prevented from being not larger than a certain size. In this case, the user has to execute a print job practically and confirm the font size in the printing result of the print job. If it is not an expected result, adjusting the N-up number and reprinting will have to be repeated. Thus, not only does the user spend labor and time but waste of paper also occurs due to printing for confirming the font size.

SUMMARY OF THE INVENTION

It is therefore an object of the invention to provide printing apparatus, print instruction apparatus, image forming apparatus, a printing method and a program in which the font size is prevented from being reduced excessively in an N-up mode so that the readability is prevented from being spoiled and waste of paper is reduced.

In order to achieve the object, according to a first aspect of the invention, there is provided a printing apparatus having an N-up mode for printing out a predetermined number of sheets of original document images on one sheet of paper, including: an arithmetic section for performing an arithmetic operation to obtain a maximum number of sheets of said original document images so as to prevent any image on said paper from including characters not larger than a predetermined size when the N-up mode is performed; and an output section for printing out the maximum number of sheets of the original document images obtained by the arithmetic operation of the arithmetic section on one sheet of paper.

According to the first configuration, the N-up mode is performed based on the maximum number of sheets of the original document images obtained by the arithmetic operation of the arithmetic section so as to prevent any image on the paper from including characters not larger than a predetermined size. Thus, the size of fonts included in any image on the paper is prevented from being reduced excessively.

According to a second aspect of the invention, there is provided a print instruction apparatus for issuing an N-up mode print instruction to image forming apparatus having an N-up mode for printing out a predetermined number of sheets of original document images on one sheet of paper, including: an input section for inputting a desired minimum size of characters; a storage section for storing the predetermined number of sheets of original document images and the character size information inputted from the input section; and a transmitting section for transmitting the desired minimum size of characters and the predetermined number of sheets of original document images to the image forming apparatus so as to issue the N-up mode print instruction thereto.

According to the second configuration, when a desired minimum size of characters is inputted, the maximum number of sheets of the original document images is obtained by arithmetic operation of the arithmetic section. Then, the N-up mode is performed by the image forming apparatus on the basis of the obtained maximum number of sheets.

According to a third aspect of the invention, there is provided a print instruction apparatus for issuing an N-up mode print instruction to image forming apparatus having an N-up mode for printing out a predetermined number of sheets of original document images on one sheet of paper, including: an input section for inputting a desired minimum size of characters; a storage section for storing the predetermined number of sheets of original document images and the character size information inputted from the input section; an arithmetic section for performing an arithmetic operation to obtain a maximum number of sheets of the original document images so as to prevent any image on the paper from including characters not larger than the desired minimum size when the N-up mode is performed; and a transmitting section for transmitting the maximum number of sheets and the predetermined number of sheets of the original document images to the image forming apparatus so as to issue the N-up mode print instruction thereto.

According to the third configuration, the maximum number of sheets of the original document images is obtained by arithmetic operation of the image forming apparatus on the basis of a print instruction from the print instruction apparatus. Then, the N-up mode is performed by the image forming apparatus.

According to a fourth aspect of the invention, there is provided an image forming apparatus having an N-up mode for printing out a predetermined number of sheets of original document images on one sheet of paper, and performs the N-up mode in accordance with a print instruction from print instruction apparatus, including: an arithmetic section for performing an arithmetic operation to obtain a maximum number of sheets of the original document images so as to prevent any image on the paper from including characters not larger than a predetermined size when the N-up mode is performed; and an output section for printing out the maximum number of sheets of the original document images obtained by the arithmetic operation of the arithmetic section on one sheet of paper.

According to the fourth configuration, the N-up mode is performed based on the maximum number of sheets of the original document images obtained by arithmetic operation so as to prevent any image on the paper from including characters not larger than a predetermined size. Thus, the size of fonts included in any image on the paper is prevented from being reduced excessively.

According to a fifth aspect of the invention, there is provided a computer program for a computer to perform an arithmetic operation to obtain a maximum number of sheets of original document images so as to prevent any image on paper from including characters not larger than a predetermined size when an N-up mode for printing out a predetermined number of sheets of said original document images on one sheet of paper is performed.

According to the fifth configuration, when the program is executed by a computer, the maximum number of sheets of the original document images is obtained by arithmetic operation so as to prevent any image on the paper from including characters not larger than a predetermined size. The N-up mode is performed based on the obtained maximum number of sheets. Thus, the size of fonts included in any image on the paper is prevented from being reduced excessively.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
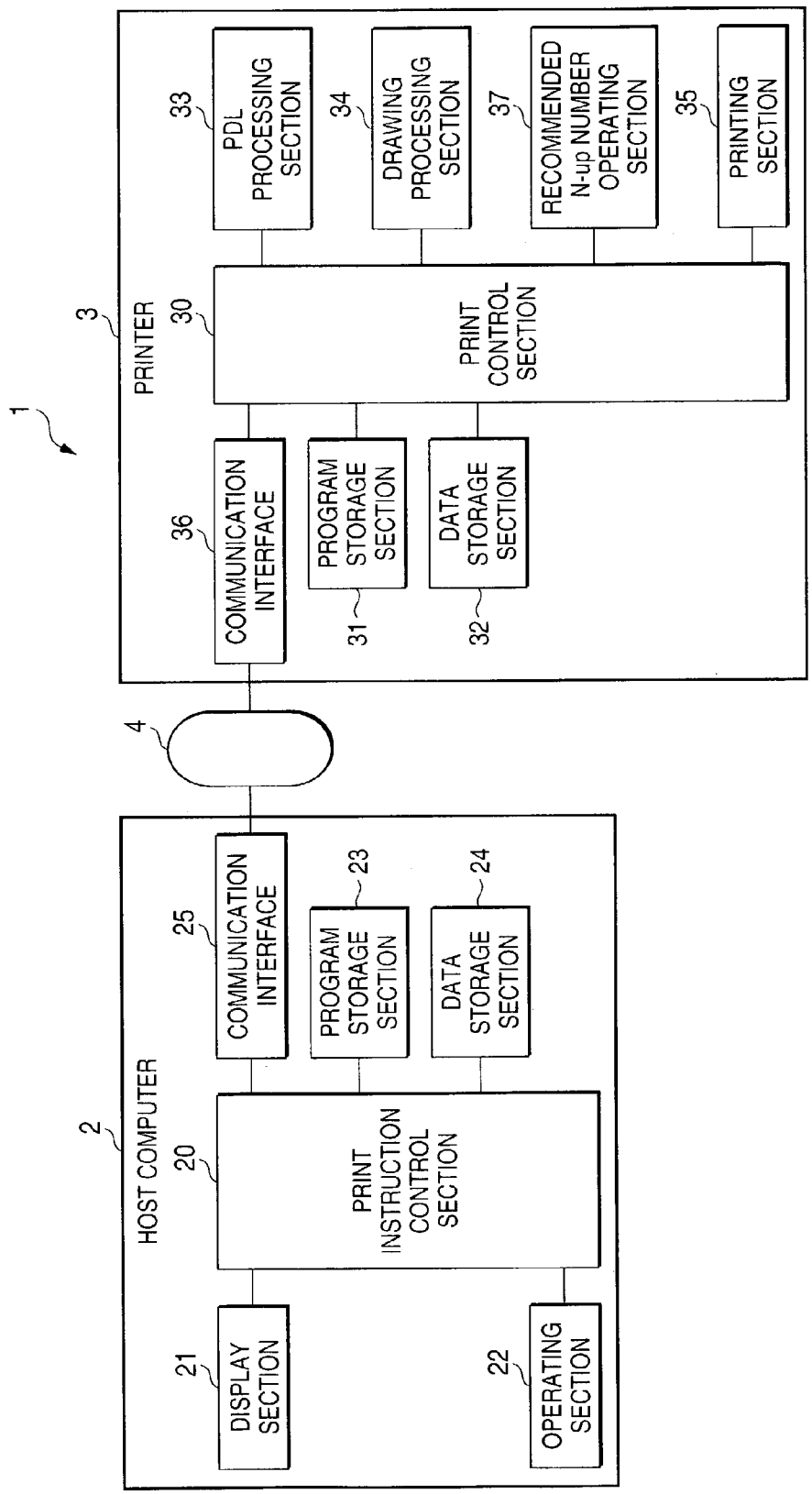
FIG. 1 is a block diagram showing a configuration of a printing system according to a first embodiment of the invention.

FIG. 1 shows a printing system according to a first embodiment of the invention. In the printing system 1, a host computer 2 as print instruction apparatus and a printer 3 as image forming apparatus are connected through a network 4 such as the Internet or a LAN (Local Area Network). Incidentally, the host computer 2 and the printer 3 may be connected directly through a Centronics cable or the like. In addition, a PDA (Personal Digital Assistant) or a portable terminal such as a portable telephone set may be used in place of the host computer 2.

The host computer 2 has a print instruction control section 20, a display section 21 such as a CRT display or a liquid crystal display, an operating section 22 such as a keyboard or a mouse, a program storage section 23, a data storage section 24 and a communication interface (I/F) 25. The print instruction control section 20 controls the host computer 2 as a whole while controlling communication with the printer 3. The operating section 22 is used for inputting print parameters including a desired minimum font size when an N-up mode is performed, or for issuing a print instruction. The program storage section 23 stores operating programs for the print instruction control section 20. The data storage section 24 stores document data made up by a document processor application program. The communication I/F 25 is connected to the network 4.

A document processor application program such as word processor software, a printer driver which is a program for controlling the printer 3, and so on, are stored in the program storage section 23. The printer driver has a function to generate PDL (Page Description Language) data from document data made up using the document processor application program.

The printer 3 has a print control section 30, a program storage section 31, a data storage section 32, a PDL processing section 33, a drawing processing section 34, a printing section 35, a communication interface (I/F) 36 and a recommended N-up number operating section 37. The print control section 30 controls the printer 3 as a whole while controlling communication with the host computer 2. The program storage section 30 stores operating programs for the print control section 30. The data storage section 32 stores PDL data transmitted from the host computer 2. The PDL processing section 33 interprets and processes the PDL data. The drawing processing section 34 expands the PDL data into raster image data. The printing section 35 prints the raster image data on paper in an N-up mode. The communication I/F 36 is connected to the network 4. The recommended N-up number operating section 37 performs an arithmetic operation to obtain a recommended N-up number (recommended number of sheets of an original document in the N-up mode).

The N-up number operating section 37 performs an arithmetic operation on the basis of font size information included in PDL data to obtain the maximum N-up number (recommended N-up number) with which fonts not larger than the desired minimum font size specified by the user on the host computer 2 side are not included.

Figure 3:
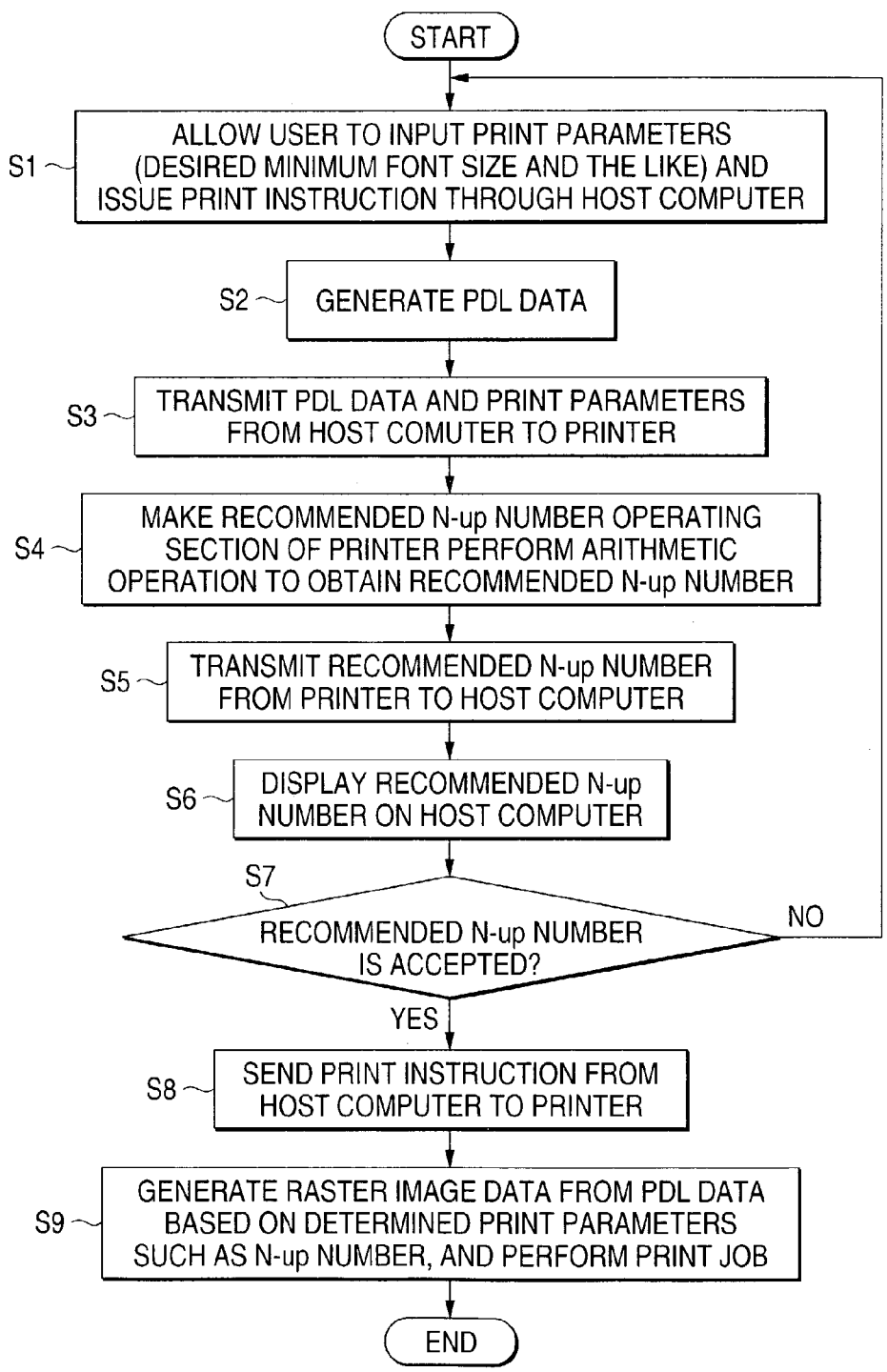
FIG. 3 is a flow chart showing an operation of the printing system according to the first embodiment of the invention.

FIG. 3 shows an operation of the first embodiment. First, the user operates the operating section 22 of the host computer 2, inputs print parameters such as the desired minimum font size, and issues a print instruction (S1). The print instruction control section 20 of the host computer 2 generates PDL data from document data stored in the data storage section 24 on the basis of the function belonging to the printer driver stored in the data storage section 24 (S2). The print instruction control section 20 transmits the PDL data and the print parameters such as the desired minimum font size using a format such as PJL commands, to the printer 3 through the communication I/F 26 and the network 4 (S3).

The print control section 30 of the printer 3 stores the received PDL data into the data storage section 32. The recommended N-up number operating section 37 of the printer 3 performs an arithmetic operation on the basis of the desired minimum font size specified by the user and the font size information included in the PDL data to thereby obtain a maximum N-up number (recommended N-up number), with which fonts not larger than the desired minimum font size are not included (S4). The print control section 30 transmits the recommended N-up number obtained by the recommended N-up number operating section 37 to the host computer 2 through the communication I/F 36 and the network 4 (S5).

The print instruction control section 20 of the host computer 2 displays the "recommended N-up number" on the display section 21 (S6) and inquires of the user whether printing should be performed with the displayed recommended N-up number (S7). Here, when the user desires another N-up number, the routine of processing returns to Step S1, in which the user inputs print parameters including the desired minimum font size again. When the user accepts the recommended N-up number displayed on the display section 21, the user makes an operation indicating OK. Then, the print instruction control section 20 of the host computer 2 transmits a print instruction to the printer 3 through the communication I/F 26 and the network 4 (S8).

The drawing processing section 34 of the printer 3 generates raster image data from the PDL data stored in the data storage section 32, and then combines the determined N-up number of pieces of raster image data so as to form print data. The formed print data is transferred to the printing section 35. The printing section 35 prints the print data on paper (S9).

Figure 2:
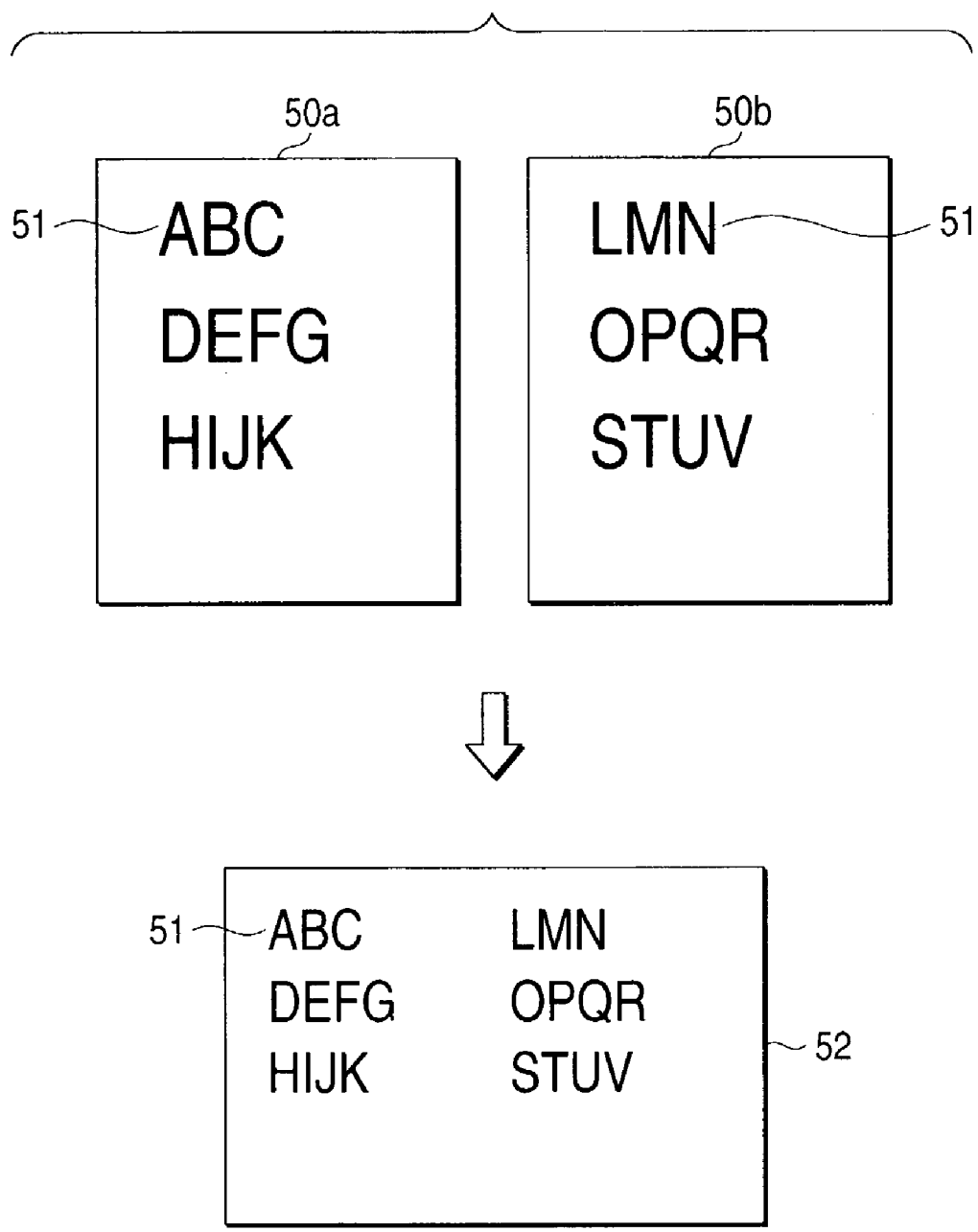
FIG. 2 is a view showing an example of a print based on 2in1.

FIG. 2 shows an example of a print in the case (2in1) where the N-up number has been determined to be "2". Image data 50a and 50b both in A-4 size including fonts 51 with a predetermined size are reduced and printed on one A-4 size sheet of paper 52.

According to this first embodiment, the demand that the user wants to reduce paper to be printed on is satisfied. In addition, it is possible to prevent waste of prints printed with an excessively large N-up number. In addition, it is possible to prevent readability from being spoiled due to use of documents printed with an excessively large N-up number. Further, it is possible to satisfy the demand that the user wants to print with a reasonable font size. Since the arithmetic operation to obtain a recommended N-up number is performed on the printer 3, the load on the host computer 2 can be reduced.

Figure 4:
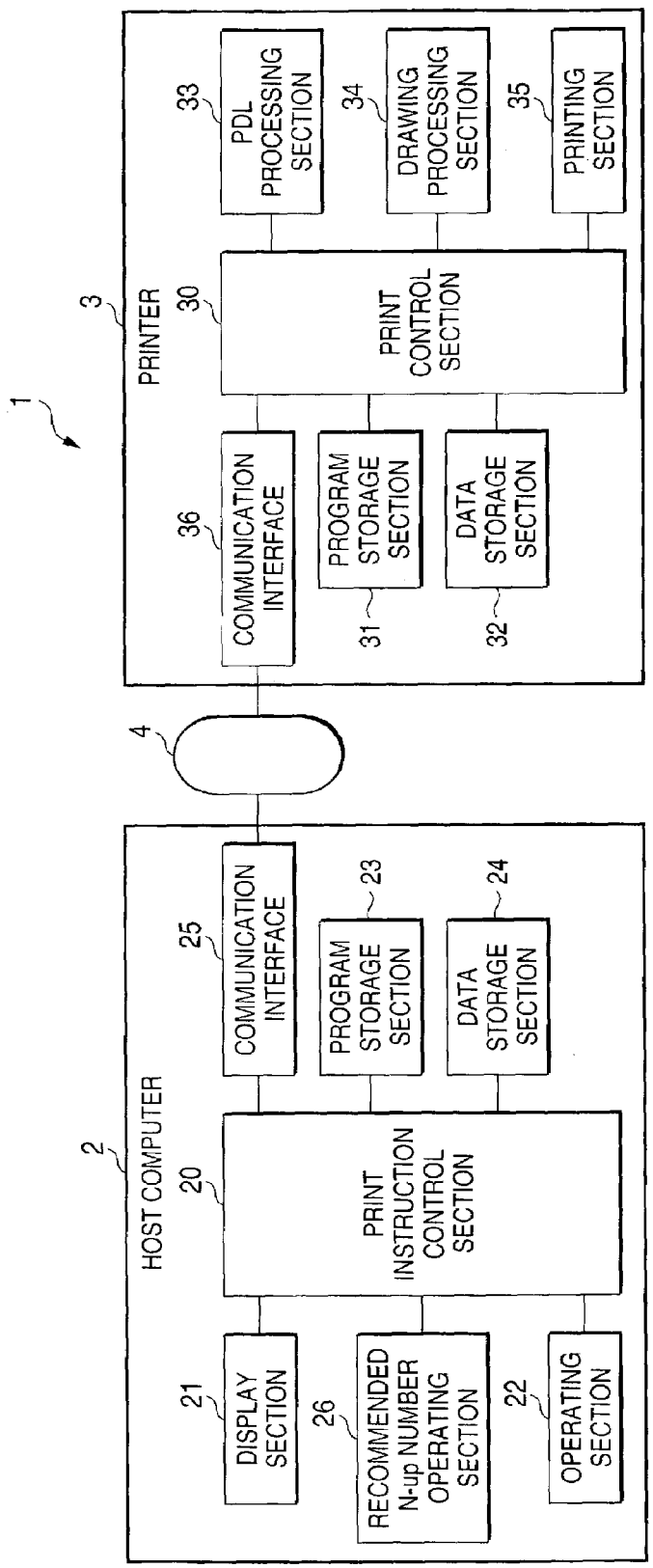
FIG. 4 is a block diagram showing a configuration of a printing system according to a second embodiment of the invention.

FIG. 4 shows a printing system according to a second embodiment of the invention. This second embodiment has the same configuration as the first embodiment, except that the arithmetic operation to obtain a recommended N-up number is performed on the host computer 2 in this second embodiment. That is, the host computer 2 has a recommended N-up number operating section 26 as well as a print instruction control section 20, a display section 21, an operating section 22, a program storage section 23, a data storage section 24 and a communication I/F 25. The printer 3 has a print control section 30, a program storage section 31, a data storage section 32, a PDL processing section 33, a drawing processing section 34, a printing section 35 and a communication I/F 36.

Figure 5:
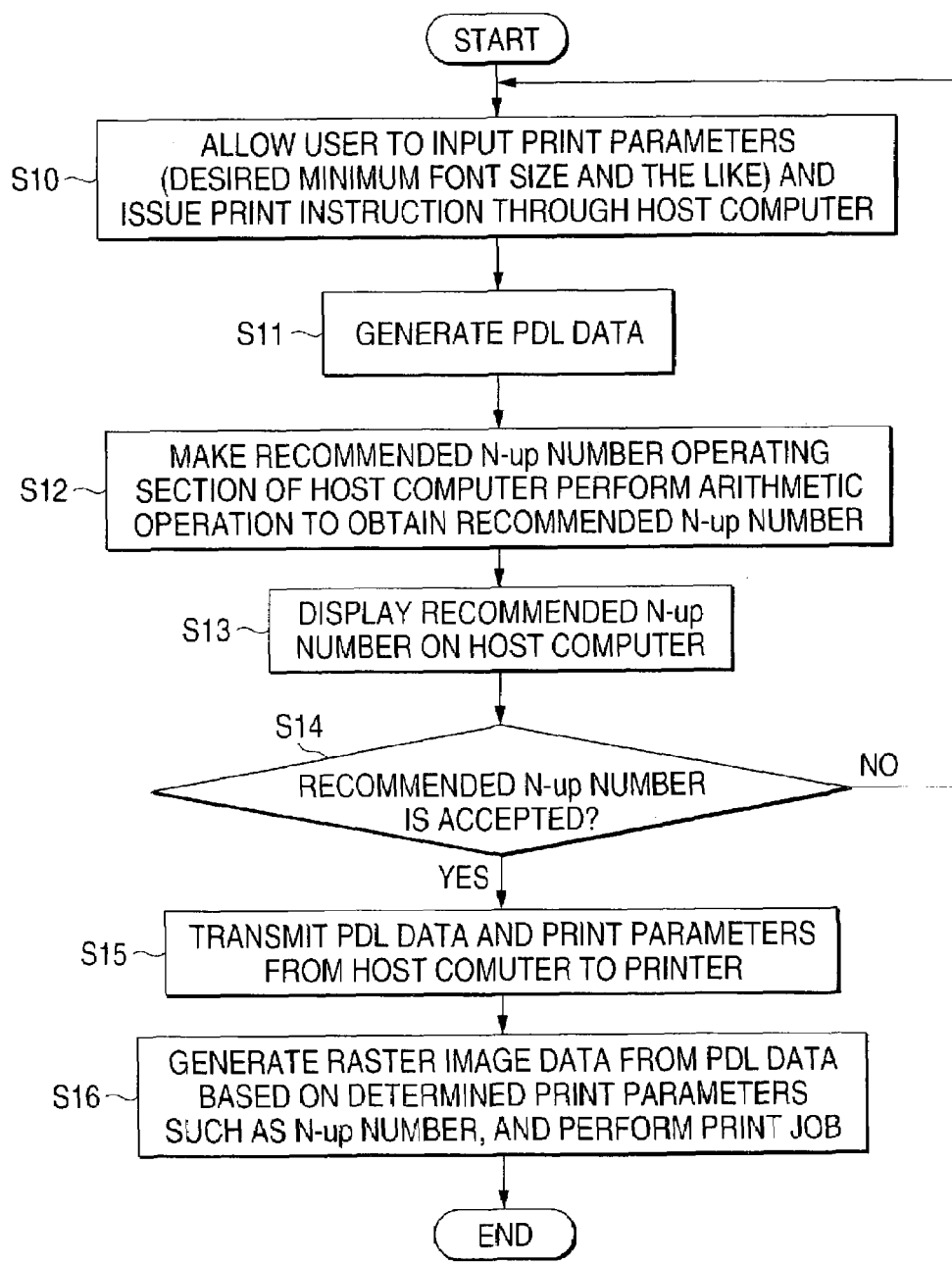
FIG. 5 is a flow chart showing an operation of the printing system according to the second embodiment of the invention.

FIG. 5 shows the operation of the second embodiment. First, the user operates the operating section 22 of the host computer 2, inputs print parameters such as "desired minimum font size", and issues a print instruction (S10). The print instruction control section 20 of the host computer 2 generates PDL data from document data stored in the data storage section 24 on the basis of the function belonging to the printer driver stored in the data storage section 24 (S11). The recommended N-up number operating section 26 of the host computer 2 performs an arithmetic operation to obtain a recommended N-up number with which fonts not larger than the desired minimum font size are not included (S12). The print instruction control section 20 displays the recommended N-up number on the display section 21 (S13) and inquires of the user whether printing should be performed with the displayed recommended N-up number (S14). Here, when the user desires another N-up number, the routine of processing returns to Step S10, in which the user inputs print parameters including the "desired minimum font size" again. When the user accepts the recommended N-up number displayed on the display section 21, the user makes an operation indicating OK. Then, the print instruction control section 20 of the host computer 2 transmits the PDL data and the print parameters such as the desired minimum font size using a format such as PJL commands, to the printer 3 through the communication I/F 26 and the network 4 (S15).

The print control section 30 of the printer 3 stores the received PDL data into the data storage section 32. The drawing processing section 34 generates raster image data from the PDL data stored in the data storage section 32, and then combines the determined N-up number of pieces of raster image data so as to form print data. The formed print data is transferred to the printing section 35. The printing section 35 prints the print data on paper (S16).

According to this second embodiment, in the same manner as in the first embodiment, it is possible to prevent the front size from being reduced excessively in the N-up mode. Thus, the readability can be prevented from being spoiled, and waste of paper can be reduced. In addition, since the arithmetic operation to obtain a recommended N-up number is performed on the host computer 2, the load on the printer 3 can be reduced.

Incidentally, the invention is not limited to the embodiments, but various modifications can be made thereon. For example, the user may be alerted to the fact that the printing result includes a font not larger than the specified size even when the recommended N-up number is set at 1. In addition, after a maximum N-up number with which fonts not larger than the desired minimum font size are not included is presented to the user, a final N-up number maybe determined by the user referring to the result with the maximum N-up number. Further, when areas of title, text, notes, etc, can be distinguished, the desired minimum font size may be established for each area. This configuration is effective in such a case that the user wants to reduce the text within a readable range while accepting the notes reduced to be too small to read.

In addition, the desired minimum font size may be set for each kind of font by the operating section 22. In addition, a threshold value may be provided in font size so that fonts not larger in font size than the threshold value are excluded from the coverage of the minimum font size. That is, fonts having a small font size originally are excluded from the coverage of font size evaluation.

In addition, a default value of the desired minimum font size may be set without specifying the desired minimum font size whenever printing is performed. Further, the user may set a default value (provided as table information) as the desired minimum font size for each paper size (or for each kind of font).

In addition, of desired minimum font sizes specified by the user in the past, the most frequent desired minimum font size may be set as a default value.

In addition, the N-up mode may be performed while the size in a part of a print area specified by the user is left as it is.

In addition, the user specifying a desired minimum font size and a desired N-up number may determined whether the result of printing with the N-up number includes fonts smaller than the desired minimum font size or not.

In addition, although a predetermined number of sheets of original document images are printed out on one sheet of paper in the embodiments, they may be outputted on a display screen.

In addition, although the size information of characters is acquired from PDL data, original document images may be read by a scanner so that the size information of characters can be detected from the scanning result.

Figure 6:
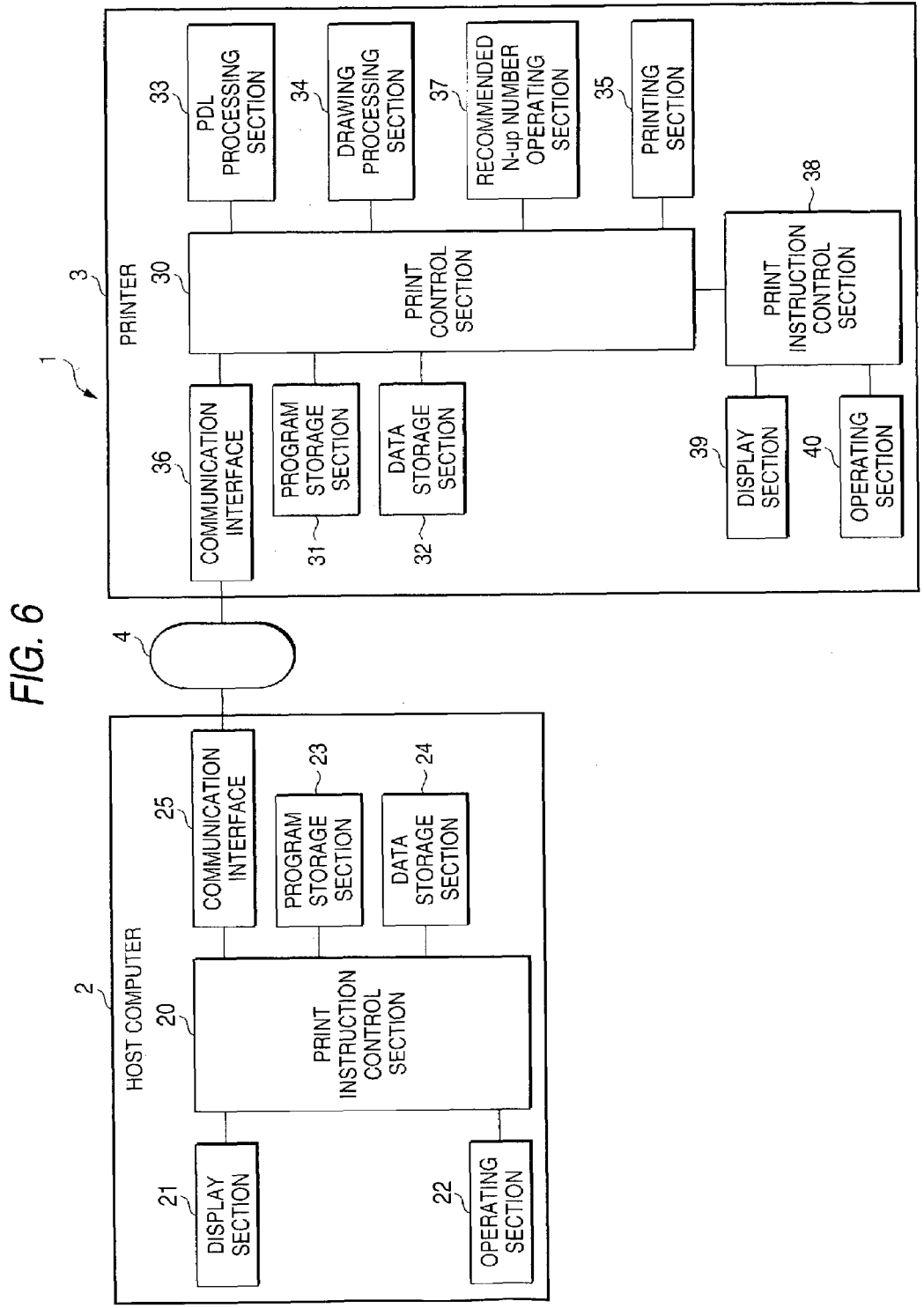
FIG. 6 is a block diagram showing a configuration of a printing system according to another embodiment of the invention.

As described above, the print instruction control section 20, the display section 21 and the operating section 22 are provided in the host computer 2 in the embodiments. However, as shown in FIG. 6, a print instruction control section 38, a display section 39 and an operating section 40, each having a feature corresponding to the above sections in the host computer 2, may be provided in the printer 3 itself.

As described above, according to the invention, a maximum number of sheets of original document images obtained by arithmetic operation performed to prevent any image on paper from including characters not larger than a predetermined size are printed out on one sheet of paper. Thus, the font size is prevented from being reduced excessively in the N-up mode so that the readability is prevented from being spoiled and waste of paper is reduced.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A printing apparatus having an N-up mode for printing out a predetermined number of sheets of original document images on one sheet of paper, comprising:
   an arithmetic section for performing at least one arithmetic operation to obtain a maximum number of sheets of said original document images so as to prevent any image on said paper from including characters not larger than a predetermined size when the N-up mode is performed, based on character size information that indicates a minimum character size after a reduction; and
   an output section for printing out the maximum number of sheets of the original document images obtained by the arithmetic operation of the arithmetic section on one sheet of paper;
   wherein the minimum character size is directly inputted by a user before a first of the at least one arithmetic operation.

2. The printing apparatus according to claim 1, wherein the arithmetic section performs the arithmetic operation to obtain the maximum number of sheets based on the predetermined number of sheets of the original document images and the character size information.

3. The printing apparatus according to claim 2, wherein the original document images and the character size information are included in PDL data.

4. The printing apparatus according to claim 1, further comprising:
   an input section for inputting a desired minimum size of characters, wherein
   the arithmetic section performs the arithmetic operation to obtain a maximum number of sheets of the original document images so as to prevent any image on said paper from including characters not larger than the desired minimum size when the N-up mode is performed, based on character size information that indicates a character size after a reduction that is specified by a user.

5. The printing apparatus according to claim 4, wherein the input section allows a user to input the desired minimum size for each kind of characters.

6. The printing apparatus according to claim 4, wherein the input section allows a user to input the desired minimum size of characters for each area of the original document images.

7. The printing apparatus according to claim 4, further comprising:
a display section for displaying the maximum number of sheets obtained by the arithmetic operation of the arithmetic section; and
an instruction section for issuing a print instruction based on the maximum number of sheets displayed on the display section, wherein
the output section prints out the maximum number of sheets of the original document images obtained by the arithmetic operation of the arithmetic section on one sheet of paper when the print instruction is issued from the instruction section.

8. The printing apparatus according to claim 4, wherein the input section further allows user to input a desired number of sheets, further comprising:
a determination section for determining whether characters not larger than the desired minimum size are included in the images on the paper or not when said N-up mode is performed with said desired number of sheets, and
the output section prints out the desired number of sheets of the original document images obtained by the arithmetic operation of the arithmetic section on one sheet of paper when the determination section determines that a characters not larger than the desired minimum size are included in the images on the paper.

9. A print instruction apparatus for issuing an N-up mode print instruction to an image forming apparatus having an N-up mode for printing out a predetermined number of sheets of original document images on one sheet of paper, comprising:
an input section for inputting a minimum character size;
a storage section for storing the predetermined number of sheets of original document images and the minimum character size inputted from the input section; and
a transmitting section for transmitting the minimum character size and the predetermined number of sheets of original document images to the image forming apparatus so as to issue the N-up mode print instruction thereto, wherein the minimum character size indicates a minimum character size after a reduction;
wherein the minimum character size is specified by a user before any N-up mode print instruction is issued.

10. A print instruction apparatus for issuing an N-up mode print instruction to image forming apparatus having an N-up mode for printing out a predetermined number of sheets of original document images on one sheet of paper, comprising:
an input section for inputting a minimum character size;
a storage section for storing the predetermined number of sheets of original document images and the minimum character size inputted from the input section;
an arithmetic section for performing at least one arithmetic operation to obtain a maximum number of sheets of the original document images so as to prevent any image on the paper from including characters not larger than the minimum character size when the N-up mode is performed, wherein the minimum character size indicates a minimum character size after a reduction; and
a transmitting section for transmitting the maximum number of sheets and the predetermined number of sheets of the original document images to the image forming apparatus so as to issue the N-up mode print instruction thereto;
wherein the minimum character size is directly specified by a user before a first of the at least one arithmetic operation.

11. An image forming apparatus having an N-up mode for printing out a predetermined number of sheets of original document images on one sheet of paper, and performs the N-up mode in accordance with a print instruction from print instruction apparatus, comprising:
an arithmetic section for performing at least one arithmetic operation to obtain a maximum number of sheets of the original document images so as to prevent any image on the paper from including characters not larger than a predetermined size when the N-up mode is performed, based on character size information that indicates a minimum character size after a reduction; and
an output section for printing out the maximum number of sheets of the original document images obtained by the arithmetic operation of the arithmetic section on one sheet of paper;
wherein the minimum character size is directly inputted by a user before a first of the at least one arithmetic operation.

12. A printing method in an N-up mode for printing out a predetermined number of sheets of original document images on one sheet of paper, comprising:
performing at least one arithmetic operation to obtain a maximum number of sheets of the original document images so as to prevent any image on the paper from including characters not larger than a predetermined size when said N-up mode is performed, based on character size information that indicates a minimum character size after a reduction; and
printing out the maximum number of sheets of the original document images on one sheet of paper;
wherein the minimum character size is directly inputted by a user before a first of the at least one arithmetic operation.

13. A computer-readable recording medium that stores a program including instructions for a computer comprising:
performing at least one arithmetic operation to obtain a maximum number of sheets of original document images so as to prevent any image on paper from including characters not larger than a predetermined size when an N-up mode for printing out a predetermined number of sheets of said original document images on one sheet of paper is performed, based on character size information that indicates a minimum character size after a reduction;
wherein the minimum character size is directly inputted by a user before a first of the at least one arithmetic operation.

* * * * *